United States Patent [19]

Wesch

[11] Patent Number: 4,486,553
[45] Date of Patent: Dec. 4, 1984

[54] FIRE-RETARDANT COMPOSITION AND METHOD FOR PRODUCING FIRE-RESISTANT LAYERS

[75] Inventor: Ludwig Wesch, Heidelberg, Fed. Rep. of Germany

[73] Assignee: Odenwald-chemie GmbH, Schonau, Fed. Rep. of Germany

[21] Appl. No.: 365,501

[22] Filed: Apr. 5, 1982

Related U.S. Application Data

[63] Continuation of Ser. No. 165,263, Jul. 2, 1980, abandoned.

[30] Foreign Application Priority Data

Mar. 10, 1980 [DE] Fed. Rep. of Germany ....... 3009104

[51] Int. Cl.$^3$ .............................................. C08K 59/54
[52] U.S. Cl. ................. 523/179; 428/310.5; 523/400; 523/402
[58] Field of Search ............. 521/85, 91, 94, 108; 428/310.5, 414, 417, 418; 523/402, 451, 452, 179, 414, 400, 461

[56] References Cited

U.S. PATENT DOCUMENTS

| 3,513,114 | 5/1970 | Hahn et al. | 260/8 |
| 3,642,531 | 2/1972 | Peterson | 428/921 |
| 4,123,575 | 10/1978 | Wesch et al. | 428/414 |
| 4,263,352 | 4/1981 | Kaltenbach et al. | 523/402 |

FOREIGN PATENT DOCUMENTS 2726269 12/1978 Fed. Rep. of Germany .
1244424 9/1971 United Kingdom .

Primary Examiner—Veronica P. Hoke
Attorney, Agent, or Firm—Hopgood, Calimafde, Kalil, Blaustein & Judlowe

[57] ABSTRACT

There is disclosed, in one aspect, an emulsion of a hydrophilic epoxy resin containing foam forming additives which impart fire retardant properties and which compositions are useful for coating substrates. These compositions comprise (a) foam-forming, gas-evolving and/or chain-terminating additives which have an endothermic reaction at elevated temperatures and/or fillers and, (b) epoxide resin as the binder. This resin has been cured with an amine curing agent. In another aspect, the present invention comprises a method for producing fire-proof layers of structures which must be protected from fire. This method comprises coating at least part of that structure with the composition described above.

20 Claims, No Drawings

FIRE-RETARDANT COMPOSITION AND METHOD FOR PRODUCING FIRE-RESISTANT LAYERS

This is a continuation of application Ser. No. 165,263 filed July 2, 1980, now abandoned.

BACKGROUND OF THE INVENTION

The present invention relates to a fire-retardant, foam-forming composition for coating substrates. This composition comprises foam-forming, gas-evolving and/or chain-terminating additives which have an endothermic reaction at elevated temperatures, and/or fillers and an epoxide resin as a binder, which has been cured with an amine curing agent.

Epoxide resin compositions which contain epoxide resins, as well as compounds of phosphoric acid and/or nitrogen containing compounds and, if appropriate, additionally contain blowing agents, such as starch or pentaerythritol, are known. The function of the fire-retardant additives is to produce, when heated, a foam structure which has a thermally insulating effect, particularly if the foam structure has been carbonized. If the additives contain more than about 20 mole % of nitrogen and/or phosphorus and decompose at temperatures from 100° to 400° C. and are present in an amount of 30 to 70% by weight, relative to the weight of epoxide resin and curing agent, gaseous nitrogen and fire-retardant phosphorus compounds are liberated on heating, as a result of which particularly advantageous fire-retardant protective coatings may be produced. Compositions of this kind are disclosed, for example, in German Offenlegungsschrift 2,704,275.

Other attempts to impart fire-retardant properties to epoxide resin compositions include the addition of antimony compounds, phosphorus compounds, boron compounds, compounds which split off chlorine or bromine, organic tin salts and salts of calcium, cadmium, lead, magnesium and ammonium. It has been found, however, that, if these substances are used either individually or in combination, it is not possible to achieve fire protection for an adequate period, particularly in the case of buildings or other structures which must be protected from fire. In particular, values of the category F 30 (according to Fire Protection Standard DIN 4102) are only achieved with difficulty using supplementary heating. These epoxide resin compositions crack open prematurely on the surface, particularly if supplementary heating in an oven for small conflagrations is used, and deep cracks are formed, through which the heat rapidly reaches the article or the substrate which is intended to be protected. A similar effect is already achieved as a result of the supplementary heating.

The search has continued for improved flame-retardant, foam-forming compositions for coating substrates. This invention was made as a result of that search.

OBJECTS AND SUMMARY OF THE INVENTION

Accordingly, it is a general object of the present invention to avoid or substantially alleviate the above-discussed problems of the prior art.

A more specific object of the present invention is to provide improved, flame-retardant, foam-forming compositions useful for coating substrates.

Another object of the present invention is to provide a method for producing fire-proof layers on structures which must be protected from fire.

Other objects and advantages of the present invention will be described in connection with the following summary of the invention and detailed description of the preferred embodiments.

In one aspect, the present invention provides compositions for coating substrates. These compositions comprise (a) foam-forming, gas-evolving and/or chain-terminating additives which have an endothermic reaction at elevated temperatures and/or fillers and, (b) an epoxide resin as the binder. This resin has been cured with an amine curing agent.

It has been found that certain epoxide resins which may be emulsified in water are capable, when used as binders in mixtures of this type, of firmly binding water for a relatively long time and releasing it gradually. Furthermore, when these coatings are used on substrates and heat is applied to these substrates, the coatings at the utmost flake off in skin-like layers, each of which has in itself a fire-retardant action. Accordingly, excellent long-term protection against the effects of fire may be achieved. This action is improved further if coatings of this type are used alternately with fiber coatings or fleece layers and, if appropriate, one or more layers of non-hydrophilic epoxide resins containing conventional curing agents, accelerators, gas-evolving substances and/or fire-proof fillers in any desired sequence and also, if appropriate, with a final, impermeable protective layer, such as a layer of polyurethane resin, polyacrylate resin or other covering resins which are compatible with epoxides.

In another aspect, the present invention comprises a method for producing fire-proof layers of structures which must be protected from fire. This method comprises coating at least part of said structure with the composition described above.

DETAILED DESCRIPTION OF THE PREFERRED EMBODIMENTS

The binder used in the present invention is an aqueous emulsion of a hydrophilic epoxide resin formed from bisphenol A and/or bisphenol F and epichlorohydrin, having an epoxy equivalent of 175 to 210, and a diglycidyl or triglycidyl ether of diols or triols having 2 to 20 carbon atoms and, if appropriate, 1 to 8 ether oxygen atoms, in a ratio by weight of from about 75 to about 95 binder to from about 5 to about 25 glycidyl ether. The curing agent is an adduct formed from a polyamine or polyamidoamine having at least two amino groups and an epoxide compound.

The binder also contains from about 1 to about 30 percent by weight of water, relative to the emulsion, and, if appropriate, a further amount of up to about 10% by weight of water, relative to the total mixture, together with, if appropriate, one or more emulsion stabilizers.

Hydrophilic epoxide resins of this type are known as disclosed in German Offenlegungsschrift 2,726,269, and described therein as anti-corrosion agents.

In a preferred embodiment of the present invention, the epoxide resin material additionally contains a cycloaliphatic or aromatic carboxylic acid anhydride which reacts at a temperature of from about 100° C. to about 300° C. with the epoxide resin. Substances of this type are known as curing agents and include, inter alia, hexahydrophthallic anhydride, methylnadic anhydride, Het anhydride, trimellitic anhydride and pyromellitic dianhydride. The last three substances mentioned in particular react with conventional epoxide resins at temperatures between about 160° and about 290° C. and produce particularly heat-resistant materials.

It is also preferred to use additives which contain nitrogen and/or phosphorus and decompose at temperatures of from about 100° to about 600° C. as foam-forming and/or gas-evolving additives. Examples of such substances are melamine phosphate, melamine borate, guanidine phosphate, guanylurea, guanylurea phosphate, N-phenyl-N-cyclohexyl-p-phenylene-diamine, guanidine carbonate, and benzosulphohydrazide. It is particularly preferred that the material should contain from about 30 to about 70% by weight of such substances, the quantity of nitrogen and/or phosphorus being more than 20 mole % and the decomposition temperatures being at least about 50° C. apart if at least two of these substances are present.

In a preferred embodiment of the present invention, it is also possible to employ, in the epoxide resin material as the water-soluble foam-former, a dicyandiamide phosphate condensation product and/or a dicyandiamide resin and/or guanidine silicate.

Particularly advantageous long-term fire protection values are obtained if, in addition to the binder, the material also contains a novolac resin in a quantity of from about 10 to about 40% by weight, relative to the epoxide resin. This effect is improved further by adding blowing agents, such as water-soluble alkali metal silicates and/or metasilicates, aluminum phosphate or aluminum oxide trihydrate. Mixtures of two or more of these blowing agents may also be used. In this case it is possible to obtain, with supplementary heating, values up to F 90 (as specified in DIN 4102), which is a value which cannot be achieved by conventional fire-retardant synthetic resins.

The composition of the present invention may also contain stabilizers and/or further gas-evolving agents, such as pentaerythritol, melamine, tylose, or dioxan, in the case of components which must be particularly protected, fibers made from glass, gypsum, asbestos, graphite, boron, tungsten, steel or other heat-resistant material. The carbon skeleton formed under the influence of fire is mechanically stabilized as the result of additives of this type.

The composition of the present invention may be used by either applying it in the form of an emulsion directly to substrate to be protected or by first processing it independently, using a loose carrier material, and applying it at a later time to the substrate or the article which is to be protected against fire. If several layers are combined, it is possible to achieve fire protection values (as specified in DIN 4102) of up to 150 minutes (without supplementary heating). Since the material is chemically neutral and is also resistant to the action of water, heat or cold, it can be used both inside and in the out of doors.

The epoxide resin material of the present invention is particularly useful for the protection of steel frame structures, hangars, multi-story buildings, bridges, refineries, oil fields, pipe platforms and other objects or structures which must be protected from fire. Furthermore, it is also particularly useful for protecting structures made of wood or plastics, such as ferries or ships.

The article to be protected may be preferably first provided with a primer, the choice of which depends on the object to be protected. For example, for steel, a primer based on epoxide may be preferably used. The composition of the present invention is then applied in several layers by brushing, rolling or spraying.

Excellent fire protection values are obtained by the application of from about 2 to about 3 layers of 900 grams square meter each. Although the thickness applied is only from about 1 to about 2 millimeters, on heating the material, it expands up to 20 centimeters.

The carbon skeleton formed in the event of fire may be stabilized by placing between each layer a mechanical barrier layer composed of fibers or fleeces which are either processed to form a fabric or are sprayed on and which are applied either in a dry state or are sprayed on wet in a single operation together with the composition of the present invention. Any fiber resistant to high temperatures which has previously been mentioned may be used. However, it is also possible to use the expanding silicates previously mentioned and other hydratable metal salts of aluminum, lead, tin, boron or phosphorus. It is particularly advantageous to use aluminum phosphate or aluminum oxide trihydrate or other agents which have a strong water-binding action and only release water at elevated temperatures, such as zeolites and/or kieselguhr. Under the influence of fire, these barrier layers of hydratable substances produce stable, expanded layers as a result of the evaporation of the water contained in the epoxide resin material. In addition, they have a strongly endothermic action, so that cooling of the intermediate layer is effected.

If desired, it is also possible to apply, over the two to three, or if necessary more, layers of epoxide resin material, a top layer which is compatible with epoxides, particularly a layer resistant to the effects of weathering and composed of polyurethane or an acrylate dispersion or another plastic.

In addition to the composition of the present invention, one may also employ a conventional, non-hydratable epoxide resin material, the latter being applied as a second or third layer in combination with the composition of the present invention. Here too, it is possible to use intermediate layers as described above. As a result of this, it is unnecessary in many cases to apply a top layer, since the outer epoxide resin does not contain water and thus is resistant to weathering.

The present invention is further illustrated by the following examples. All parts and percentages in the examples as well as in the specification and claims are by weight unless otherwise specified.

EXAMPLE

A commercial primer based on epoxide resin is applied in a thin layer to a steel structure. An aqueous emulsion which is prepared from 5 parts of mixture A and 1 part of mixture B is then applied on top of this:

| Mixture A | |
|---|---|
| A hydratable epoxide resin formed from bisphenol A and epichlorohydrin, having an epoxide number of 24–25, epoxide equivalent of 172–178, Gardner color number between 1 and 3, a density of 1.13 (at 20° C.), a viscosity of 1,200–1,500 cP (Rutapox VE 2913) | 22 parts by weight |
| Novolac resin, having an 80% strength dispersion (4186 Rutgerswerke) | 5.0 parts by weight |
| Stabilizer (VVE, Rutgerswerke Duisburg) (optionally tylose (MHB 10,000, Hoechst AG)) | 1.2 parts by weight |
| Pentaerythritol | 9.0 parts by weight |

| -continued | |
|---|---|
| Melamine resin (Maprenol (VMF 3910) | 5.0 parts by weight |
| Phosphate flame-retardant (Phoschek P 30) | 13.0 parts by weight |
| Titanium dioxide | 9.9 parts by weight |
| Tris-(dichloroethyl) phosphate (Phosgard C22R) | 6.5 parts by weight |
| Ground glass fibers (milled fiber EC-IOS) | 2.4 parts by weight |
| Distilled water | 20.0 parts by weight |

| Mixture B | |
|---|---|
| Polyamine curing agent having an amine equivalent of from 125 to 150, a viscosity of 7,000–8,000 cP, having a density of 1.00 (at 20° C.), Gardner color number of from 8 to 10, and a solids content of 75% (ABS4 Rutgerswerke) | 53.6 parts by weight |
| Amidoamide curing agent (105/B Rutgerswerke) | 26.8 parts by weight |
| Anhydride curing agent (Y, Rutgerswerke) | 7.9 parts by weight |
| Guanylurea | 10.0 parts by weight |
| Trisdimethylaminophenol (DMP 30) | 10.7 parts by weight |

The pot life of the mixture is two hours. For multi-layer application, it is advisable to make the next application after a time period of between 24 and 48 hours.

A top layer of 4 parts of mixture C together with 1 part of mixture D (described hereinbelow) is applied over two such coatings. Expanded glass fibers having a layer thickness of from 1 to 2 millimeters are between these two coatings.

| Mixture C | |
|---|---|
| A polyester formed from adipic acid, phtallic triol and diol, having a concentration of ethylglycol acetate (VPKL 5/2332 Bayer AG) | 39.14 parts by weight |
| Titanium dioxide | 27.48 parts by weight |
| Montmorillonite alkylammonium salt thickener (Bentone 34), having a concentration of 10% in benzene | 5.44 parts by weight |
| Zinc accelerator (Nuboflex, 8% of Zn) | 0.11 part by weight |
| Silicone oil (OL, 10% concentration) | 0.530 part by weight |
| Tris-(dichloroethyl) phosphate | 7.7 parts by weight |
| Aluminum hydroxide | 7.7 parts by weight |
| Ethylglycol acetate | 4.37 parts by weight |
| Butylglycol acetate | 7.6 parts by weight |

| Mixture D | |
|---|---|
| Mixture D is an aromatic mixture of diisocyanates (Desmodur VPKL Bayer AG). | |

The resulting material has a flame-retardant value of 150 minutes (as specified in DIN 4102).

The flame-retardant value in an oven could be increased to F 90 by interposing an intermediate layer comprising a mixture of 4 parts by weight of mixture E and 1 part by weight of mixture F as described hereinbelow.

| Mixture E | |
|---|---|
| An epoxide resin formed from bisphenol A and epichlorohydrin (not hydratable) (Beckopox EP 117, Hoechst AG) | 29.0 parts by weight |
| Novolac resin (VS 4186, 80% strength, Rutgerswerke) | 11.5 parts by weight |
| Pentaerythritol | 12.0 parts by weight |
| Phoschek P-30 | 18.0 parts by weight |
| Melamine resin (Maprenal MF 980) | 3.5 parts by weight |
| Titanium dioxide | 8.4 parts by weight |
| Tris-(dichloroethyl) phosphate | 9.3 parts by weight |
| Melamine resin (Maprenal MF 590) | 6.5 parts by weight |
| Glass fiber (milled fiber EC-IOS) | 1.8 parts by weight |

| Mixture F | |
|---|---|
| Amine curing agent (Euredur 43, Hoechst AG) | 40.80 parts by weight |
| Amine curing agent (CC, Rutgerswerke) | 25.4 parts by weight |
| Anhydride curing agent (Y, Rutgerswerke) | 7.7 parts by weight |
| Trisdimethylaminophenol (DMP 30) | 7.7 parts by weight |
| Asbestos fibers (Sylodex 2X) | 1.1 parts by weight |
| Guanylurea | 15.4 parts by weight |
| Glass fiber (milled fiber EC-IOS) | 1.9 parts by weight |

The pot life of this mixture is 40 minutes.

The finished, fire-retardant material formed from the layers mentioned has a stable, closed external skin up to 1,000° C. On exceeding this limit, there is a very slow flaking off of thin skins and finally the formation of a foam layer which later becomes carbonized.

Flame retardation was observed both with radiant heat and with convected heat.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

I claim:

1. A fire retardant composition for coating substrates, said composition containing foam-forming additives and/or foam-forming fillers, said additives and/or fillers being gas evolving and/or chain terminating, bound by an aqueous emulsion of (a) a hydrophilic epoxide resin capable of being emulsified with water, and (b) a curing agent.

2. The composition of claim 1, wherein said foam-forming or gas-evolving additives are additives which contain nitrogen and/or phosphorus and which decompose at a temperature of from about 100° to about 600° C.

3. The composition of claim 2, wherein said composition contains from about 30 to about 70% by weight of said additives which contain nitrogen and/or phosphorus, the quantity of nitrogen and/or phosphorus being more than about 20 mole %, with the proviso that if at least two of these substances are present, the decomposition temperatures of these substances are at least 50° C. apart.

4. The composition of claim 1, wherein said composition contains at least two compounds selected from the group consisting of melamine phosphate, melamine borate, guanidine phosphate, guanylurea, guanylurea phosphate, N-phenyl-N-cyclohexyl-p-phenylenediamine, guanidine carbonate or benzosulphohydrazide.

5. The composition of claim 1, wherein said composition contains at least one water-soluble foam former selected from the group consisting of dicyandiamide-phosphate condensation product, dicyandiamide resin, and guanidine silicate.

6. The composition of claim 1, wherein said composition additionally contains a novolac resin in a quantity of from about 10 to about 40% by weight, relative to the epoxide resin.

7. The composition of claim 1, wherein said composition additionally contains a stabilizer selected from the group consisting of pentaerythitol, melamine, tylose and dioxan.

8. The composition of claim 1, wherein said composition additionally contains a blowing agent, a water-binding agent selected from the group consisting of an alkali metal silicate and/or metasilicate, aluminum phosphate and/or fine-grained aluminum oxide trihydrate, a zeolite and/or kieselguhr.

9. The composition of claim 5, 6, 7, or 8, wherein said composition additionally contains heat-resistant fibers selected from the group consisting of glass, gypsum, asbestos, graphite, boron, tungsten, and steel.

10. The composition of claim 1, wherein said composition additionally contains a reactive diluent and at least one of said additives has an endothermic reaction at elevated temperatures.

11. The composition of claim 1, wherein the amount of water is from about 1 to about 40% by weight of said composition.

12. The composition of claim 1, wherein said hydrophilic epoxide resin is formed from the reaction between epichlorohydrin and at least one member selected from the group consisting of bisphenol A and bisphenol F to produce an epoxy equivalent of from about 175 to about 210.

13. The composition of claim 10, wherein said reactive-diluent is a glycidyl ether composed of diols or triols having from 2 to 20 carbon atoms and from 1 to 8 ether oxygen atoms, and the ratio by weight of said epoxide resin to said reactive-diluent is from about 75 to about 95% to from about 5 to about 25%.

14. The composition of claim 1, wherein said curing agent is formed from an epoxide compound and at least one member of the group consisting of a polyamine, a polyamidoamine, and a polycarboxylic anhydride.

15. The composition of claim 1, wherein said composition additionally contains at least one emulsion stabilizer.

16. The composition of claim 1, wherein said composition additionally contains at least one cycloaliphatic or aromatic carboxylic acid anhydride which reacts with said epoxide resin at a temperature of from about 100° to about 250° C.

17. A hydrophilic epoxy resin emulsion based fire retarding, foam producing, coating agent including foam producing additives and/or foam producing fillers, said additives and/or fillers being gas evolving and/or chain stopping and/or endothermically reacting, wherein said hydrophilic epoxy resin emulsion includes a curing agent which functions as a binder for said additives and fillers, respectively, and wherein said emulsion comprises a water emulsifiable hydrophilic epoxy resin and from about 1 to about 40% water, and said curing agent is at least one member selected from the group consisting of a polyamine, a polyamidoamine, and a polycarboxylic acid anhydride.

18. A binder for a fire retarding, foam producing, coating agent on a hydrophilic epoxy resin emulsion basis including foam producing additives and/or foam producing fillers, said additives and/or fillers being gas evolving and/or chain stopping and/or endothermically reacting, wherein said hydrophilic epoxy resin emulsion comprises (a) a water emulsifiable hydrophilic epoxy resin, (b) a curing agent selected from at least one member of the group consisting of a polyamine, a polyamidoamine and a polycarboxylic acid anhydride, and (c) from about 1 to about 40% water, wherein said water emulsifiable hydrophilic epoxy resin is diluted by means of a glucidyl ether reactive diluent in proportions of from about 75 to about 95% epoxy resin to from about 5 to about 25% reactive diluent.

19. A binder for a fire retarding, foam producing, coating agent on an aqueous epoxy resin emulsion basis including foam producing additives and/or foam producing fillers, said additives and/or fillers being gas evolving and/or chain stopping and/or endothermically reacting, wherein said aqueous epoxy resin emulsion comprises (a) a water emulsifiable, hydrophilic epoxy resin, (b) a curing agent selected from at least one member of the group consisting of a polyamine, a polyamidoamine, and a polycarboxylic acid anhydride, and (c) from about 1 to about 40% water, wherein said hydrophilic eopxy resin has an epoxy equivalent of between 175 and 210 and contains a di- or triglycidylether of diols or triols having 2 to 20 carbon atoms in proportions of from about 75 to about 95% of epoxy resin to from about 5 to about 25% of said glycidylether.

20. A method for producing fire-proof layers on structures which must be protected from fire, comprising coating at least part of said structure with the composition of claim 1 or 10.

* * * * *